Dec. 8, 1959 — O. V. PULLEN — 2,916,541
FLUSH MOUNTING FOR A CONTROL DEVICE
Filed Dec. 27, 1954 — 2 Sheets-Sheet 1

INVENTOR.
ORRIN V. PULLEN
BY Robert S Craig
ATTORNEY

Dec. 8, 1959          O. V. PULLEN          2,916,541
FLUSH MOUNTING FOR A CONTROL DEVICE
Filed Dec. 27, 1954          2 Sheets-Sheet 2
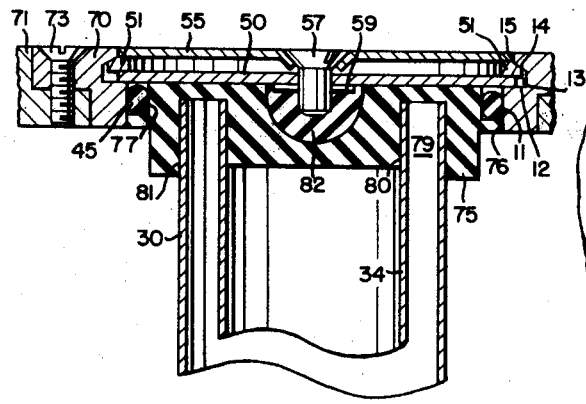
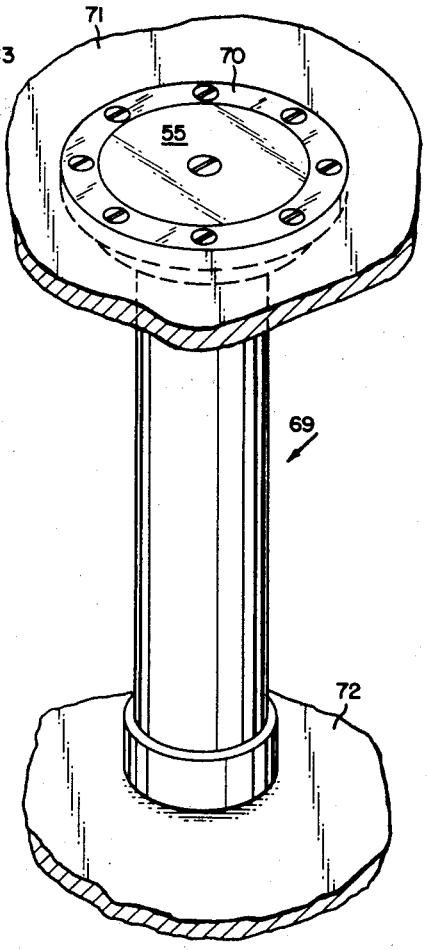
INVENTOR.
ORRIN V. PULLEN
BY
ATTORNEY United States Patent Office 2,916,541
Patented Dec. 8, 1959

2,916,541

FLUSH MOUNTING FOR A CONTROL DEVICE

Orrin V. Pullen, Minneapolis, Minn., assignor to Minneapolis-Honeywell Regulator Company, Minneapolis, Minn., a corporation of Delaware Application December 27, 1954, Serial No. 477,671

1 Claim. (Cl. 174—52)

This invention relates to the flush mounting of control devices, and more particularly to the flush mounting of a control device such as a fuel gauge or calibrator in the wing tank of a thin wing airplane. A flush type mounting is particularly desirable for the mounting of control devices in thin-winged airplanes due to the lack of available space for a flange type mounting. In a thin wing airplane, the skin surface of the wing also forms the fuel tank, and a fuel gauge or other device mounted within the fuel tank necessarily need be mounted in the wing surface proper, as the previously known flange type of mounting would leave protusions, mounting bolts, and connecting wires on the outer wing surface the necessity for a flush type mounting is obvious. My invention permits the mounting of a fuel gauge such as to permit the capacitor sensing elements to extend substantially to the top of the tank, i.e. to the bottom of the supporting member or plate. A flush type mounting eliminates any turbulence on the wing surface due to such protusions and gives an economy of space which is very important in aircraft design. This novel flush type mounting is also lighter, smaller in size, and easier to manufacture than previous type mountings.

Therefore, one of the objects of my invention is to provide a flush type mounting for a control device in a wing or other surface where lack of turbulence is important. Another object of my invention is to provide a flush type mounting for a fuel gauge in a wing tank of an airplane permitting the capacitor sensing elements to extend substantially to the top of the tank. Yet another object of my invention is to provide a mounting for a control device that is light in weight, small in size, and easy to manufacture.

Figure 1:
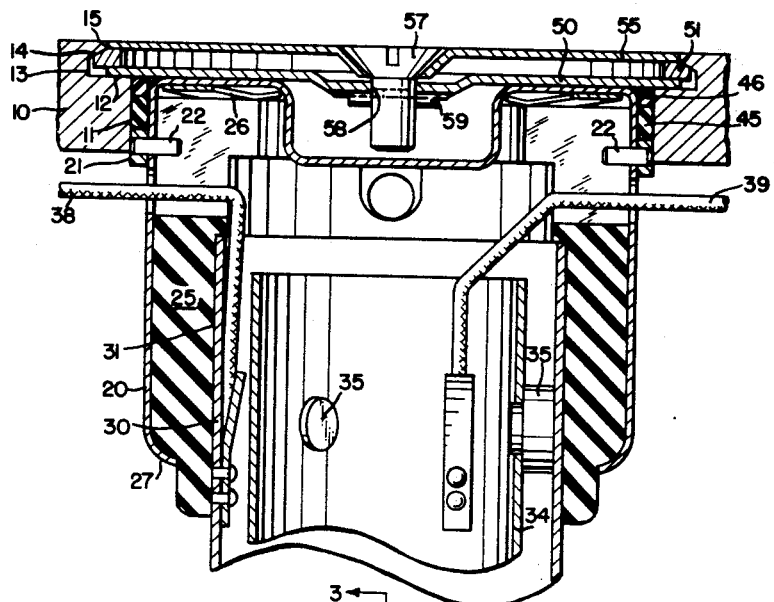
Figure 2:
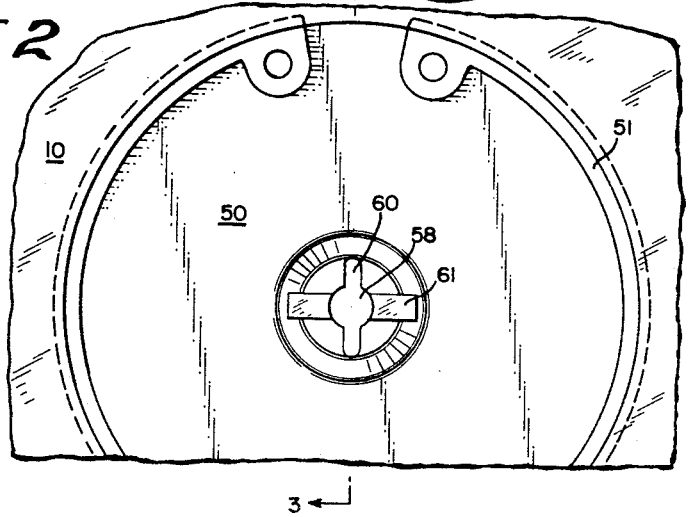
Figure 3:
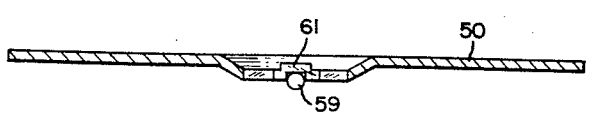

These and other objects of the present invention will readily become apparent when the following description is read in light of the accompanying drawings in which:

Figure 1 is a cross-section taken through the longitudinal axis of an embodiment of my invention, Figure 2 is a plan view of the embodiment of Figure 1, with the cover plate removed, looking downward, Figure 3 is a cross-section of a circular plate supporting the control device taken along lines 3—3 of Figure 2, Figure 4 is an elevation, partly in section, of a second embodiment of my invention, Figure 5 is a perspective view of either embodiment of my invention showing a portion of the top and bottom wing surfaces.

With respect to Figures 1, 2, and 3, a portion of the top wing member 10 is shown with an opening in which a control device is shown mounted within. The opening in the wing member 10 is of varying diameter and consists of a cylindrical portion 11, an abutment 12, an annular slot 13, a conical abutment 14, and a cylindrical portion 15. The control device shown in the specific embodiment of my invention as seen in the drawings is that of a capacitance type fuel gauge.

A cup-shaped member 20 of metallic or similar material has a diameter smaller than that of cylindrical portion 11 in the opening of wing member 10. A spacing ring 21 is riveted or pinned to cup-shaped member 20 by a plurality of members 22. Spacing ring 21 cooperates with cylindrical portion 11 in the opening in wing member 10 and positions cup-shaped member 20 within the wing tank. An insert 25 of plastic or other dielectric material is enclosed within cup-shaped member 20. A spring washer 26 biases insert 25 downwardly against a turned in portion 27 of cup-shaped member 20. This positions insert 25 firmly within cup-shaped member 20. The fuel gauge sensing element as shown consists of two metallic capacitor plates which are in the form of concentric tubes and are attached to insert 25. The outer metallic tube 30 is cemented to a cylindrical portion 31 of insert 25. The inner metallic tube 34 is attached in spaced relation to metallic tube 30 by a plurality of dielectric spacers 35. Electrical connections 38 and 39, to the outer tube 30 and the inner tube 34 respectively, extend out the top of metallic tubes 30 and 34 through openings provided in insert 25 and cup-shaped member 20. The electrical connections 38 and 39 can be carried through proper connectors out the side of the fuel tank to the indicating means (not shown).

An O-ring 45 cooperates with cup-shaped member 20 and cylindrical portion 11 of the opening in wing member 10 to effect a pressure seal between the wing member 10, and cup-shaped member 20. A filler-ring 46 is used to space the O-ring 45 from the end of the cup-shaped member 20. A circular plate 50 is welded to the top of cup-shaped member 20. Circular plate 50 cooperates with abutment 12 in the opening of wing member 10, and supports the control device within the wing tank. A flexible retaining ring 51 is inserted in the opening in the wing member 10, and upon release will expand its diameter so that it cooperates with conical abutment 14 in the opening of wing member 10 and with the top surface of circular plate 50, thus holding circular plate 50 in cooperation with abutment 12. A second circular plate 55 of a diameter equal to cylindrical portion 15 in the opening in wing member 10 can then be placed in the opening of wing surface 10 and will fill the balance of the opening in wing member 10, leaving a flush top surface of the wing member 10. The circular plate 55 is of a thickness such that it rests on the top portion of flexible retaining ring 51 and is flush with the top surface of wing member 10. Circular plate 55 has an aperture at the center thereof for receiving a flush head fastener 57. Flush head fastener 57 extends through an aperture 58 in circular plate 50. Flush head fastener 57 has a pin 59 extending therethrough which will enter through the portion 60 of aperture 58. When flush head fastener 57 is inserted in the aperture 58 in circular plate 50 and circular plate 55 is sprung downward slightly so that pin 59 is below circular plate 50, a 90° rotation of flush head fastener 57 will allow pin 59 to slip into slot 61 allowing circular plate 55 to spring back into position flush with the top of wing member 10 and securely fasten circular plate 55 to circular plate 50 and the wing surface.

Referring now to Figures 4 and 5 in which a second embodiment of my invention is shown, the control device is shown mounted in an access cover 70 attached to the top of a wing member 71 by a plurality of screws 73. A control device 69 is shown in Figure 5 in its relative position to the top wing surface 71 and the bottom wing surface 72.

Similar parts are given similar numbers in both embodiments of my invention. In this embodiment of my invention the circular opening, for the mounting of the control device, is cut in an access cover 70 which is attached by a plurality of screws 73 to the top wing surface 71 of a thin wing airplane. The opening cut in access cover 70 is similar to the one shown in the first embodiment of my invention in that it has a cylindrical portion 11, an abutment 12, an annular slot 13, a conical abutment 14, and a second cylindrical portion 15.

A mounting member 75 of dielectric material has a cylindrical portion 76 that cooperates with cylindrical portion 11 of access cover 70 to position mounting member 75 in the access cover 70. Mounting member 75 has annular groove 77 in spaced relation with cylindrical portion 11 of access cover 70. An O-ring 45 fits in annular groove 77 cooperating with mounting member 75 and cylindrical portion 11 of access cover 70 effecting a pressure seal between access cover 70 and mounting member 75. Mounting member 75 has a second annular groove 79 forming cylindrical portions 80 and 81 on mounting member 75. The inner concentric metallic tube 34 is cemented to mounting member 75 at cylindrical portion 80, and the outer cylindrical metallic tube 30 is cemented to mounting member 75 at cylindrical portion 81.

In this embodiment of my invention the electrical connections 38 and 39, which are attached to concentric metallic tubes 30 and 34 respectively, are shown coming from the bottom of the control device.

A circular plate 50 is cemented or otherwise securely fastened to mounting member 75 and cooperates with abutment 12 in access cover 70. Circular plate 50 thereby supports the mounting member 75 and the control device in the wing tank. A flexible retaining ring 51 cooperates with conical abutment 14 and the top of circular plate 50 to hold circular plate 50 against abutment 12. A circular plate 55 rests on flexible retaining ring 51 and cooperates with the cylindrical portion 15 of access cover 70 to fill the opening in access cover 70 leaving a flush surface on the top of access cover 70. A flush head fastener 57 is inserted in a central aperture in circular plate 55 and extends through a central aperture in circular plate 50 and has a pin 59 that also passes through a central aperture in the circular plate 50. A rubbery resilient material 82 substantially fills a hemispherical recess in the top of mounting member 75, and biases the flush head fastener 57 upward. When flush head fastener 57 is inserted through the central apertures in circular plates 55 and 50 it is then rotated 90° the pin 59 will now bear against the under surface of circular plate 50 securely fastening circular plate 55 to circular plate 50 and the access cover 70.

Either of the two embodiments of my invention shown could have the control device mounted either directly in a hole cut in the wing surface or in an access cover already in the wing surface, and either could have the electrical connections coming from the bottom of the concentric tubes or out through suitable holes at the top of the tubes. My invention is useful and desirable in that it provides a mounting means for a control device, such as a fuel gauge sensing element which can be mounted flush with the surface upon which it is to be mounted, is readily accessible for inspection, removal or replacement, and gives a sturdy mounting that is light in weight, small in size and easy to manufacture.

Although I have described my invention in two preferred forms for carrying my invention into effect, it is to be understood that variations and modifications may be had without departing from the spirit of the invention. I therefore intend to limit the scope of my invention only by the appended claim.

I claim:

A flush mounting in an outer surface of an aircraft comprising, a mounting surface with an opening therein, a peripheral recess within said opening of such shape as to form an upper abutment and a lower abutment with an annular slot in between, a cup-shaped member of lesser diameter than the opening in said mounting surface, a dielectric insert inside said cup-shaped member, said cup-shaped member turned in to hold said insert inside said cup-shaped member, a spring washer in said cup-shaped member biasing said insert against said turned in portion of said cup-shaped member, a spacing ring attached to said cup-shaped member cooperating with said opening in said surface positioning said cup-shaped member an O-ring engaging said cup-shaped member in said opening of said surface effecting a pressure seal of said opening, a first plate attached to said cup-shaped member cooperating with said lower abutment, a flexible retaining ring cooperating with said upper abutment and said first plate holding said first plate against said lower abutment, a second plate in the opening in said mounting surface cooperating with said retaining ring and the opening, said second plate closing the opening in said mounting surface, and a screw fastener securing said second plate to said first plate leaving a flush, unobstructed surface on said mounting surface.

References Cited in the file of this patent

UNITED STATES PATENTS

| 2,578,389 | Andersson | Dec. 11, 1951 |
| 2,583,873 | Nichols | Jan. 29, 1952 |
| 2,601,176 | Smith | June 17, 1952 |
| 2,665,877 | Macgregor | Jan. 12, 1954 |
| 2,699,523 | Meyers | Jan. 11, 1955 |
| 2,811,574 | Guerreo | Oct. 29, 1957 |

FOREIGN PATENTS

| 587,289 | Great Britain | Apr. 21, 1947 |

OTHER REFERENCES

"Electronics," Magazine, vol. 23, issue No. 4, pages 77–79, April 1950, "Airplane Fuel Gas."